(12) United States Patent
Richards et al.

(10) Patent No.: US 10,018,838 B2
(45) Date of Patent: *Jul. 10, 2018

(54) AGING COMPENSATION FOR VIRTUAL REALITY HEADSET DISPLAY DEVICE

(71) Applicant: Oculus VR, LLC, Menlo Park, CA (US)

(72) Inventors: Evan Mark Richards, Santa Clara, CA (US); Nirav Rajendra Patel, San Francisco, CA (US); Andrew T. Forsyth, Kirkland, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/692,277

(22) Filed: Aug. 31, 2017

(65) Prior Publication Data

US 2017/0363865 A1    Dec. 21, 2017

Related U.S. Application Data

(63) Continuation of application No. 14/969,365, filed on Dec. 15, 2015, now Pat. No. 9,779,686.

(51) Int. Cl.
*G02B 27/00* (2006.01)
*G09G 5/00* (2006.01)
(Continued)

(52) U.S. Cl.
CPC ..... *G02B 27/0093* (2013.01); *G02B 27/0172* (2013.01); *G02B 27/0176* (2013.01);
(Continued)

(58) Field of Classification Search
CPC .. G09G 5/02; G09G 5/003; G09G 2300/0443; G09G 2320/029;
(Continued)

(56) References Cited

U.S. PATENT DOCUMENTS 6,473,065 B1 * 10/2002 Fan ..................... G09G 3/3216
                                                        315/169.1
6,541,921 B1 *  4/2003 Luciano, Jr. ............ G09G 3/12
                                                        313/495

(Continued)

OTHER PUBLICATIONS

United States Office Action, U.S. Appl. No. 14/969,365, dated Feb. 15, 2017, twenty-one pages.

*Primary Examiner* — Stephen G Sherman
(74) *Attorney, Agent, or Firm* — Fenwick & West LLP

(57) ABSTRACT

An electronic display is driven to compensate for aging of pixels in the electronic display. An aging factor is determined based on initial display data for a display portion of the electronic display during one or more monitored frames. The aging factor is indicative of aging of pixels in the display portion of the electronic display due to use corresponding to the initial display data. An aging counter for the display portion is increased based on the determined aging factor. A compensation value is determined for the display portion based on the aging counter for the display portion. Input display data for the display portion is modified during a subsequent frame according the determined compensation value. The display portion is driven with the modified input display data during the subsequent frame.

18 Claims, 6 Drawing Sheets

(51) Int. Cl.
*G09G 5/02* (2006.01)
*G09G 3/20* (2006.01)
*G02B 27/01* (2006.01)

(52) U.S. Cl.
CPC ................ *G09G 5/00* (2013.01); *G09G 5/02* (2013.01); *G02B 2027/011* (2013.01); *G02B 2027/0112* (2013.01); *G02B 2027/0123* (2013.01); *G02B 2027/0156* (2013.01); *G09G 3/2003* (2013.01); *G09G 2320/048* (2013.01)

(58) Field of Classification Search
CPC ... G09G 2330/10; G09G 2320/043–2320/048; G02B 27/0093; G02B 27/0172; G02B 27/1076; G02B 2027/011; G02B 2027/0112; G02B 2027/0123; G02B 2027/0156

USPC ....................................................... 345/694
See application file for complete search history.

(56) References Cited

U.S. PATENT DOCUMENTS

| | | | |
|---|---|---|---|
| 2003/0071804 A1* | 4/2003 | Yamazaki | G09G 3/3233 345/204 |
| 2004/0046757 A1* | 3/2004 | Yamada | G09G 3/3208 345/211 |
| 2005/0280615 A1* | 12/2005 | Cok | G09G 3/3216 345/77 |
| 2006/0077136 A1* | 4/2006 | Cok | G09G 3/3216 345/76 |
| 2008/0036708 A1 | 2/2008 | Shirasaki et al. | |
| 2009/0244047 A1* | 10/2009 | Mizutani | G09G 3/325 345/211 |
| 2011/0191042 A1 | 8/2011 | Chaji et al. | |

* cited by examiner

AGING COMPENSATION FOR VIRTUAL REALITY HEADSET DISPLAY DEVICE

CROSS REFERENCE TO RELATED APPLICATIONS

This application is a continuation of co-pending U.S. application Ser. No. 14/969,365, filed Dec. 15, 2015, which is incorporated by reference in its entirety.

BACKGROUND

The present disclosure generally relates to display devices and, more particularly, to compensating for aging of pixels in an electronic display.

Virtual reality (VR) systems typically include an electronic display that presents virtual reality images. The electronic display includes pixels that display a portion of an image by combining different wavelengths of light emitted by subpixels. Over time, subpixels experience aging, where the subpixel outputs less light over time for a given amount of applied current or voltage. Also, subpixels corresponding to different colors may age at different rates, which changes the electronic display's color balance over time. For example, in an electronic display having light emitting diodes (LEDs) or organic LEDs (OLEDs), the subpixels corresponding to the color blue age more quickly than the subpixels corresponding to the colors green and red. Accordingly, the luminance and color balance of LED and OLED electronic displays shift over time. Thus, present electronic displays exhibit reduced display quality over time.

SUMMARY

To improve image uniformity across an electronic display as well as image consistency over time, a VR system includes a display calibration unit to compensate for aging of the electronic display's pixels and subpixels. In general, the display calibration unit maintains an aging counter for a display portion of the electronic display over time. The display portion may be an individual pixel or a contiguous region of pixels (e.g., a row, a column, a rectangle). The portion may be one or more subpixels corresponding to a particular color (e.g., red, green, blue) in a contiguous region of pixels. The aging counter tracks an overall amount of usage of that display portion since the electronic display's initial use. To update the aging counter, the display calibration unit determines an aging factor representing usage of the electronic display during one or more display frames and increases the aging counter based on the aging factor. Example aging factors include a digital level or analog voltage used to drive the display portion as well as a duty cycle over the display frames.

The display calibration unit compensates for aging of a display portion according to the count value. For instance, the display calibration unit accesses the aging counter and determines a compensation value for modifying input display data. The VR system drives the display portion according to the modified input display data. For example, the VR system increases the digital level used to drive pixels to compensate for decreased luminance of the pixels. As another example, the VR system increases the digital level of blue subpixels and decreases the digital level of red or green subpixels to maintain color balance between the subpixels. The VR system may overdrive the electronic display with digital levels higher than those initially used before the panel begins aging. Thus, the VR system may maintain the luminance and color balance of the electronic display over an increased lifetime. Such calibration beneficially improves realism in stereoscopic VR displays, where disparities in luminance or color balance between two electronic displays inhibit the stereoscopic effect, cause user discomfort, or both.

Although discussed in terms of VR systems, the techniques for display device aging compensation described herein can be used with other display devices in order to improve display consistency and lifetime.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
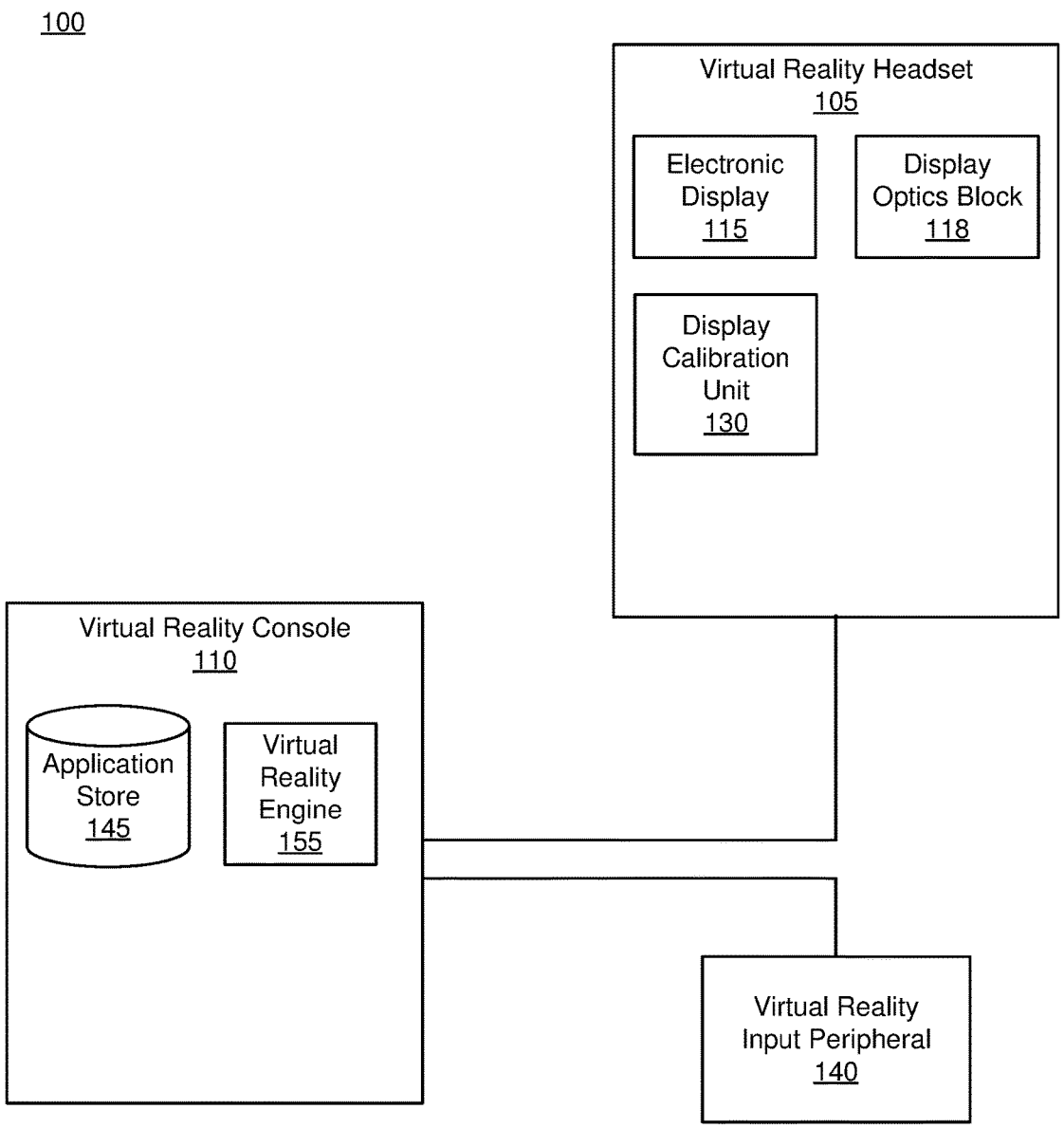
FIG. 1 is a block diagram of a system environment including a virtual reality system, in accordance with an embodiment.

FIG. 1 is a block diagram of a virtual reality (VR) system environment 100, in accordance with an embodiment. The VR system environment 100 shown by FIG. 1 comprises a VR headset 105 and a VR input peripheral 140 that are each coupled to the VR console 110. While FIG. 1 shows an example VR system environment 100 including one VR headset 105 and one VR input peripheral 140, any number of these components may be included in the VR system environment 100, or any of the components could be omitted. For example, there may be multiple VR headsets 105 controlled at least in part by one or more VR input peripherals 140 in communication with the VR console 110. In alternative configurations, different or additional components may be included in the VR system environment 100.

The VR headset 105 is a head-mounted display that presents content to a user. Examples of content presented by the VR headset 105 include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIG. 2A and FIG. 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

In various embodiments, the VR headset 105 includes an electronic display 115, a display optics block 118, and a display calibration unit 130. The VR headset 105 may omit any of these elements or include additional elements in various embodiments. Additionally, in some embodiments, the VR headset 105 includes elements combining the function of various elements described in conjunction with FIG. 1.

The electronic display 115 (also referred to as a display panel) displays images to the user according to data received from the VR console 110. In various embodiments, the electronic display 115 may comprise one or more display panels such as a liquid crystal display (LCD), an LED display, an OLED display, an active-matrix OLED display (AMOLED), a transparent OLED display (TOLED), or some other display. The electronic display 115 may include sub-pixels to emit light of a predominant color such as red, green, blue, white, or yellow. In some embodiments, the electronic display 115 renders display frames using a display driver that supplies display data to pixels arranged in rows controlled by a gate driver. The electronic display 115 may display a three-dimensional (3D) image through stereo effects produced by two-dimensional (2D) panels to create a subjective perception of image depth. For example, the electronic display 115 includes a left display and a right display positioned in front of a user's left eye and right eye, respectively. The left and right displays present copies of an image shifted horizontally relative to each other to create a stereoscopic effect (i.e., a perception of image depth by a user viewing the image).

The display optics block 118 magnifies image light received from the electronic display 115, corrects optical errors associated with the image light, and presents the corrected image light to a user of the VR headset 105. In various embodiments the display optics block 118 includes one or more optical elements. Example optical elements include: an aperture, a Fresnel lens, a convex lens, a concave lens, a filter, or any other suitable optical element that affects image light emitted from the electronic display 115. The display optics block 118 may include combinations of different optical elements as well as mechanical couplings to maintain relative spacing and orientation of the optical elements in a combination. An optical element in the display optics block 118 may have an optical coating, such as an anti-reflective coating, or a combination of optical coatings.

Magnification of the image light by the display optics block 118 allows the electronic display 115 to be physically smaller, weigh less, and consume less power than larger displays. Additionally, magnification may increase a field of view of the displayed content. For example, the field of view of the displayed content is such that the displayed media is presented using almost all (e.g., 110 degrees diagonal) or all of the user's field of view. In some embodiments, the display optics block 118 has an effective focal length larger than the spacing between the display optics block 118 and the electronic display 115 to magnify image light projected by the electronic display 115. Additionally, the amount of magnification of image light by the display optics block 118 may be adjusted by adding or by removing optical elements from the display optics block 118.

The display optics block 118 may be designed to correct one or more types of optical error, such as two-dimensional optical errors, three-dimensional optical errors, or a combination thereof. Two-dimensional errors are optical aberrations that occur in two dimensions. Example types of two-dimensional errors include: barrel distortion, pincushion distortion, longitudinal chromatic aberration, and transverse chromatic aberration. Three-dimensional errors are optical errors that occur in three dimensions. Example types of three-dimensional errors include: spherical aberration, comatic aberration, field curvature, and astigmatism. In some embodiments, content provided to the electronic display 115 for display is pre-distorted, and the display optics block 118 corrects the distortion when it receives image light from the electronic display 115 generated based on the content.

The display calibration unit 130 improves the uniformity of the pixels across the electronic display 115, the consistency of the electronic display 115 over time, or both. The display calibration unit 130 may correct for non-uniformity of pixels or subpixels across the electronic display 115 due to differences in circuit elements such as a pixel's driving transistor. The display calibration unit 130 may also correct for effects due to changing display properties of pixels or subpixels over time due to aging of circuit elements such as a pixel's driving transistor. In one embodiment, the display calibration unit 130 maintains separate aging counters for different portions of the electronic display 115. A portion of the electronic display 115 (referred to herein as a "display portion") has one or more subpixels in a contiguous region of the electronic display 115. The subpixels in a display portion may correspond to a particular color channel (i.e., range of wavelengths) such as red, green, blue, yellow, or white. Alternatively, the subpixels correspond to multiple or all of the color channels in a pixel. The display calibration unit 130 updates the aging counter for a display portion based on display data used to drive that portion. For example, the aging counter reflects digital level, analog voltage, or duty cycle used to drive the display portion. Based on the aging counter, the display calibration unit 130 modifies display data, and the VR headset 105 drives the display portion using the modified display data. Some of the functionality described with respect to the display calibration unit 130 may be performed in combination with the virtual reality engine 155. The display calibration unit 130 is described further with respect to FIG. 4.

The VR input peripheral 140 is a device that allows a user to send action requests to the VR console 110. An action request is a request to perform a particular action. For example, an action request may be to start or to end an application or to perform a particular action within the application. The VR input peripheral 140 may include one or more input devices. Example input devices include: a keyboard, a mouse, a game controller, a glove, or any other suitable device for receiving action requests and communicating the received action requests to the VR console 110. An action request received by the VR input peripheral 140 is communicated to the VR console 110, which performs an action corresponding to the action request. In some embodiments, the VR input peripheral 140 may provide haptic feedback to the user in accordance with instructions received from the VR console 110. For example, the VR input peripheral 140 provides haptic feedback when an action request is received or when the VR console 110 communicates instructions to the VR input peripheral 140 causing the VR input peripheral 140 to generate haptic feedback when the VR console 110 performs an action. In some embodiments, the VR input peripheral 140 includes an external imaging device that tracks the position, orientation, or both the VR headset 105.

The VR console 110 provides media to the VR headset 105 for presentation to the user in accordance with information received from the VR headset 105 and the VR input peripheral 140. In the example shown in FIG. 1, the VR console 110 includes an application store 145 and a virtual reality (VR) engine 155. Some embodiments of the VR console 110 have different or additional modules than those described in conjunction with FIG. 1. Similarly, the functions further described below may be distributed among components of the VR console 110 in a different manner than is described here.

In some embodiments, the VR console 110 includes a processor and a non-transitory computer-readable storage medium storing instructions executable by the processor. The processor may include multiple processing units executing instructions in parallel. The computer-readable storage medium may be any memory such as a hard disk drive, a removable memory, or a solid-state drive (e.g., flash memory, dynamic random access memory (DRAM)). In various embodiments, the modules of the VR console 110 described in conjunction with FIG. 1 are encoded as instructions in the non-transitory computer-readable storage medium that, when executed by the processor, cause the processor to perform the functionality further described below.

The application store 145 stores one or more applications for execution by the VR console 110. An application is a group of instructions, that when executed by a processor, generates content for presentation to the user. Content generated by an application may be in response to inputs received from the user via movement of the VR headset 105 or of the VR input peripheral 140. Examples of applications include: gaming applications, conferencing applications, video playback application, or other suitable applications.

The VR engine 155 executes applications within the VR system environment 100 and receives input data from the VR peripheral 140 as well as tracking data. The tracking data includes position and orientation data of the VR headset 105, the VR input peripheral 140, or both. The tracking data may further include eye tracking data indicating the user's estimated or actual gaze point. Using the input data and tracking data, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input peripheral 140 and provides feedback to the user indicating that the action was performed. The feedback may be visual or audible feedback via the VR headset 105 or haptic feedback via the VR input peripheral 140. In some embodiments, the VR engine 155 performs some or all of the functionality of the display calibration unit 130.

VR Headset

Figure 2A:
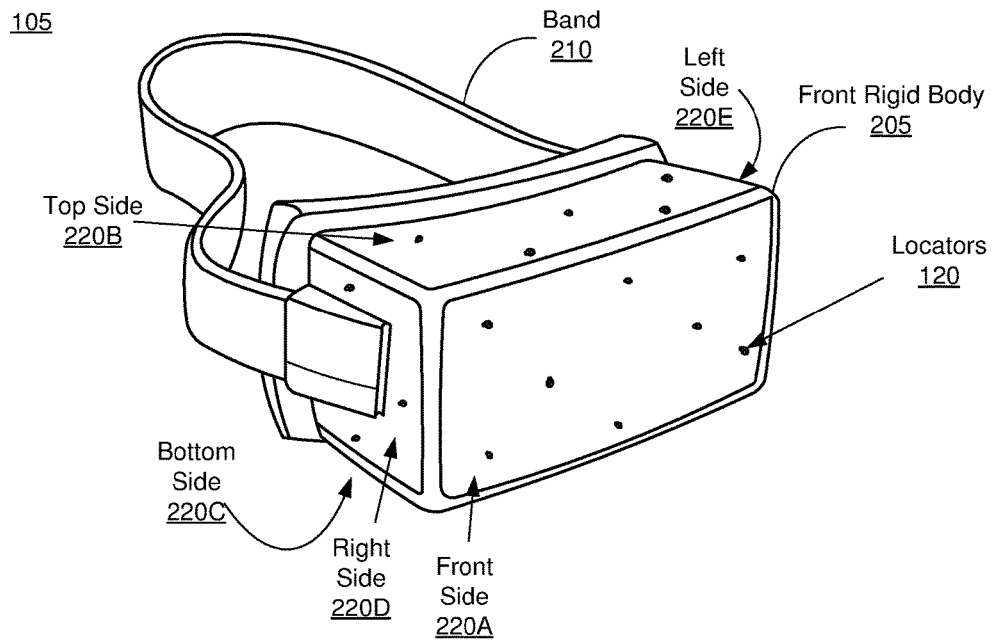
FIG. 2A is a diagram of a virtual reality headset, in accordance with an embodiment.

FIG. 2A is a diagram of one embodiment of the virtual reality (VR) headset 105. The VR headset 105 includes a front rigid body 205 and a band 210. The front rigid body 205 includes the electronic display 115 (not shown in FIG. 2A) and locators 120. In other embodiments, the VR headset 105 may include different or additional components than those depicted by FIG. 2A.

The locators 120 are located in fixed positions on the front rigid body 205 relative to one another. Each of the locators 120 emits light that is detectable by an external imaging device to enable tracking of the position and orientation of the VR headset 105. Locators 120, or portions of locators 120, are located on a front side 220A, a top side 220B, a bottom side 220C, a right side 220D, and a left side 220E of the front rigid body 205 in the example of FIG. 2A.

Figure 2B:
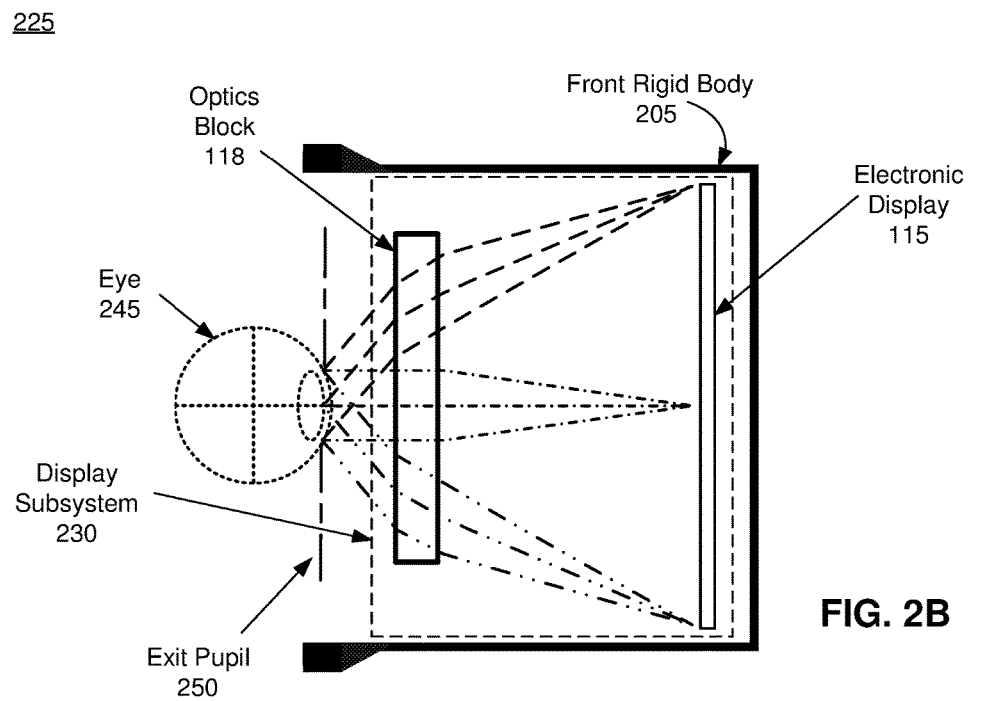
FIG. 2B is a cross-sectional view of a front rigid body of the VR headset in FIG. 2A, in accordance with an embodiment.

FIG. 2B is a cross section 225 of the front rigid body 205 of the embodiment of a VR headset 105 shown in FIG. 2A. As shown in FIG. 2B, the front rigid body 205 includes a display subsystem 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the display subsystem 230, may provide altered image light to another eye of the user.

The display subsystem 230 includes one or more electronic displays 115 and the optics block 118. The electronic display 115 emits image light toward the optics block 118. The optics block 118 magnifies the image light, and in some embodiments, also corrects for one or more additional optical errors (e.g., distortion, astigmatism, etc.). The optics block 118 directs the image light to the exit pupil 250 for presentation to the user.

Electronic Display Aging

Figure 3A:
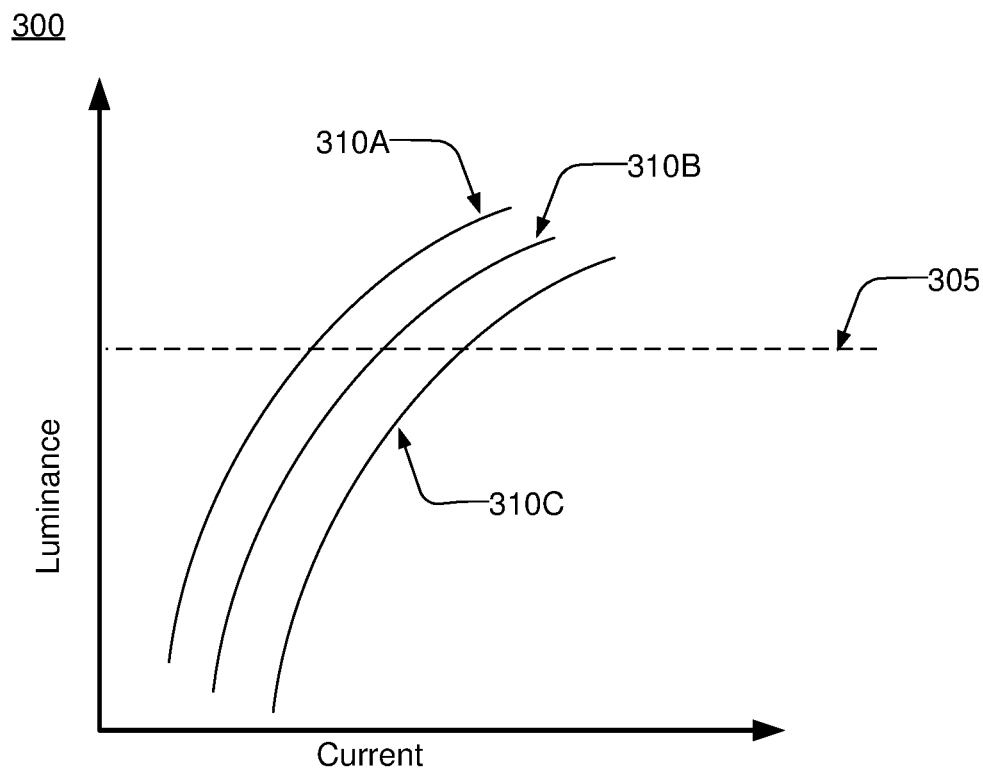
FIG. 3A is a conceptual diagram illustrating aging of an example subpixel over time, in accordance with an embodiment.

FIG. 3A is a conceptual diagram 300 illustrating aging of an example subpixel over time, in accordance with an embodiment. The diagram 300 illustrates the relationship between current through the subpixel's driving transistor and the resulting luminance of the subpixel. Curves 310A, 310B, and 310C illustrate this relationship at an initial level of usage, an intermediate level of usage, and a later level of usage, respectively. As usage increases, the luminance of the subpixel decreases when a consistent amount of current is applied. To maintain a consistent level 305 of luminance, the electronic display 115 applies an increasing amount of current or voltage to the subpixel. Thus, the VR headset 105 may compensate for pixel aging by increasing the digital level, driving voltage of display data, or driving current supplied to that pixel.

Figure 3B:
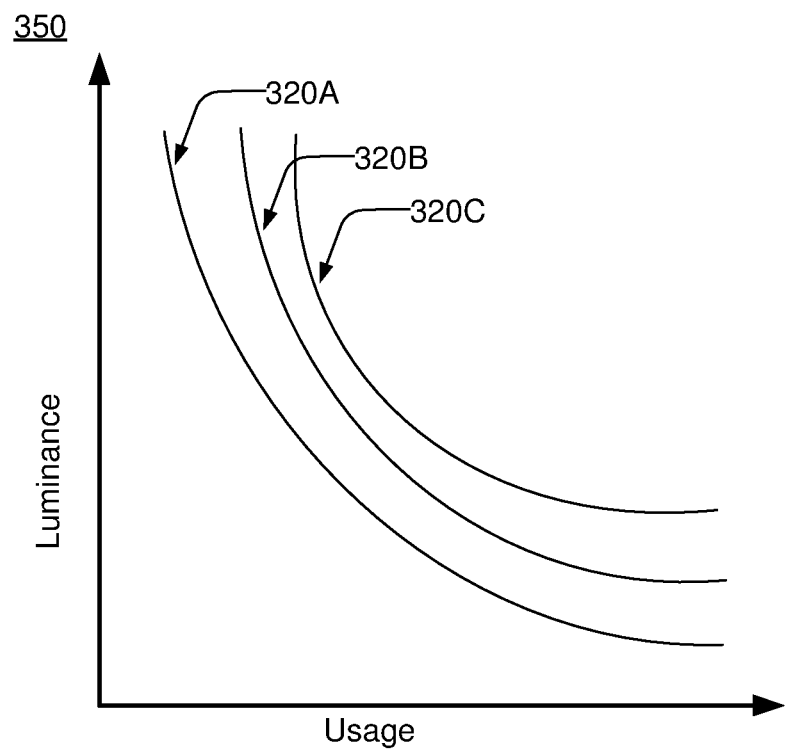
FIG. 3B is a conceptual diagram illustrating aging of subpixels in an example pixel over time, in accordance with an embodiment.

FIG. 3B is a conceptual diagram 350 illustrating aging of subpixels in an example pixel over time, in accordance with an embodiment. The pixel includes a blue subpixel, a green subpixel, and a red subpixel. The diagram 350 illustrates the relationship between luminance of the subpixels as usage of the subpixels increases for a consistent applied current and voltage. Usage may refer to an aging count, as determined by the display calibration unit 130 and described further with respect to FIG. 4. Curves 320A, 320B, and 320C illustrate this relationship for the blue pixel, the green pixel, and the red pixel, respectively. As the electronic display 115 drives the subpixels with the same current, the subpixels emit light with lower luminance. Since the different subpixels corresponding to different colors have different rates of luminance decay for a given amount of usage, the color balance of the pixel changes as usage increases. To maintain a consistent color balance, the electronic display 115 modifies the amount of current used to drive subpixels corresponding to different color channels. Thus, the VR headset 105 may compensate for panel aging by increasing the digital level, driving voltage, driving current supplied to subpixels of one color and by decreasing the digital level, driving voltage, driving current supplied to subpixels of another color.

Display Calibration Unit

Figure 4:
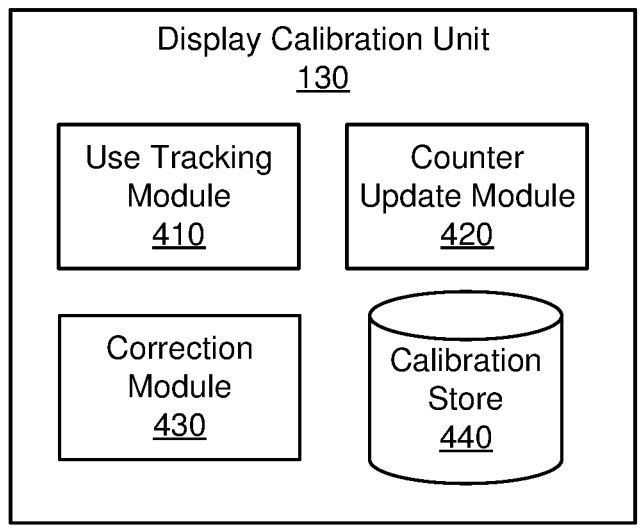
FIG. 4 is a block diagram of a display calibration unit, in accordance with an embodiment.

FIG. 4 is a block diagram of a display calibration unit 130, in accordance with an embodiment. The display calibration unit 130 includes use tracking module 410, counter update module 420, correction module 430, and calibration store 440. In other embodiments, the display calibration unit 130 may include a different combination of modules to perform at least some of the features described herein.

The use tracking module 410 monitors display data used to drive a display portion and outputs an aging factor corresponding to the display data. The display data refers to digital quantities (e.g., gray scale levels) or analog quantities (e.g., current, voltage) that describe the driving of one or more subpixels of the display portion. The use tracking module 410 determines an aging factor representing the display data used to drive the display portion during one or more monitored display frames. The aging factor may be a temporal average of the display data over the one or more monitored frames, a spatial average over the subpixels in the portion, or a combination thereof. Alternatively or additionally, the use tracking module 410 determines the aging factor from some other measure of central tendency of the display data, such as a quadratic mean, geometric mean, harmonic mean, or median.

In some embodiments, the use tracking module 410 determines the aging factor from an overall duty cycle of subpixels in the display portion. The duty cycle refers to a proportion of time the subpixels are illuminated during the one or more monitored frames normalized by the total time elapsed during the one or more monitored frames. Tracking the duty cycle of subpixels may improve accuracy of aging tracking for portions of electronics displays that often display one color for a prolonged period or that are driven using pulse width modulation. The use tracking module 410 may determine the aging factor from a combination (e.g., additive, multiplicative, weighted) of one or more averages of the display data or the duty cycle. For example, the aging factor for monitored frames in a display portion includes a weighted combination of the average gray level and the average duty level of subpixels in the display portion. Generally, the use tracking module 410 determines the aging factor from display data that has been modified to compensate for display aging, but the use tracking module 410 may alternatively determine the aging factor from the raw input display data that has not been modified to compensate for display aging.

In some embodiments, the use tracking module 410 determines the aging factor for monitored frames by sampling display data from a subset of the monitored frames. For example, the use tracking module 410 periodically samples display data from one display frame in two, five, ten, thirty, one hundred, three hundred, or one thousand display frames. The use tracking module 410 may determine the proportion of display frames based on the frame rate of the electronic panel 115 to maintain a constant sample rate (e.g., 0.1 Hz, 0.3 Hz, 1 Hz, 3 Hz). The use tracking module 410 then determines the aging factor for the monitored frames from display data used to drive the electronic display 115 during the sampled frames. Sampling beneficially reduces processing resources used to update the aging counter.

The counter update module 420 updates the aging counter for the display portion in response to the aging factor determined by the use tracking module 410. The counter update module 420 maintains an aging counter for a display portion. The display portion and aging counter may correspond to one or more pixels, pixel rows, pixel columns, pixel regions or to subpixels of a particular color in the display portion. The display portion may also include all the pixels in the entire electronic display 115 or all the subpixels of a particular color in the entire electronic display 115. The aging counter may be initialized or reset after the electronic display 115 is manufactured or after initial quality testing is performed. The counter update module 420 determines a count increase value corresponding to the aging factor and adds the count increase value to a previous value of the aging counter to update the aging counter. For example, the counter update module 420 accesses the aging counter's previous value and stores the aging counter's updated value in the calibration store 440. The count increase value may be the aging factor, so the aging counter is an accumulated sum of the aging factor. Alternatively or additionally, the counter update module 420 determines the count increase value from a function of the aging factor. For example, the counter update module 420 compares the aging factor to a threshold value and uses a predetermined value for the count increase value in response to the aging factor being greater than or equal to the threshold value.

The counter update module 420 may compare the aging factor to a plurality of thresholds defining a plurality of non-overlapping intervals over a range of the aging factor. The counter update module 420 determines which interval contains the aging factor from the thresholds and determines a count increase value corresponding to the interval. For example, an interval corresponds to a predefined count increase value, and the counter update module 420 updates the count value C according to Equation 1:

$$C_{next} = C_{prev} + \begin{cases} a_1, & F < T_1 \\ a_2, & T_1 \leq F < T_2 \\ a_3, & T_2 \leq F \end{cases}$$

where $a_i$ is a predefined count increase value corresponding to interval i, and $T_1$ and $T_2$ are thresholds defining the intervals.

As another example, an interval corresponds to a set of aging parameters, and the counter update module 420 updates the count value C according to Equation 2:

$$C_{next} = C_{prev} + \begin{cases} a_1 + b_1 F + c_1 F^2, & F < T_1 \\ a_2 + b_2 F + c_2 F^2, & T_1 \leq F < T_2 \\ a_3 + b_3 F + c_3 F^2, & T_2 \leq F \end{cases}$$

where $a_i$, $b_i$, and $c_i$ are aging parameters corresponding to interval i, and $T_1$ and $T_2$ are thresholds defining the intervals. The counter update module 420 may determine the count increase value from any polynomial, exponential, logarithmic, logistic, or other function of the aging factor. The aging factors may be positive, negative, or zero.

As a third example, the counter update value is proportional to a difference between the aging factor and a lower or upper threshold of an interval containing the aging factor, and the counter update module 420 updates the count value C according to Equation 3:

$$C_{next} = C_{prev} + \begin{cases} a_1 + b_1(T_1 - F) + c_1(T_1 - F)^2, & F < T_1 \\ a_2 + b_2(F - T_1) + c_2(F - T_1)^2, & T_1 \le F < T_2 \\ a_3 + b_3(F - T_2) + c_3(F - T_2)^2, & T_2 \le F \end{cases}$$

where $a_i$, $b_i$, and $c_i$ are aging parameters corresponding to an interval i, and $T_1$ and $T_2$ are thresholds defining the intervals. The counter update module 420 may determine the count increase value from any polynomial, exponential, logarithmic, logistic or other function of the difference between the aging factor and an interval threshold.

Figure 5:
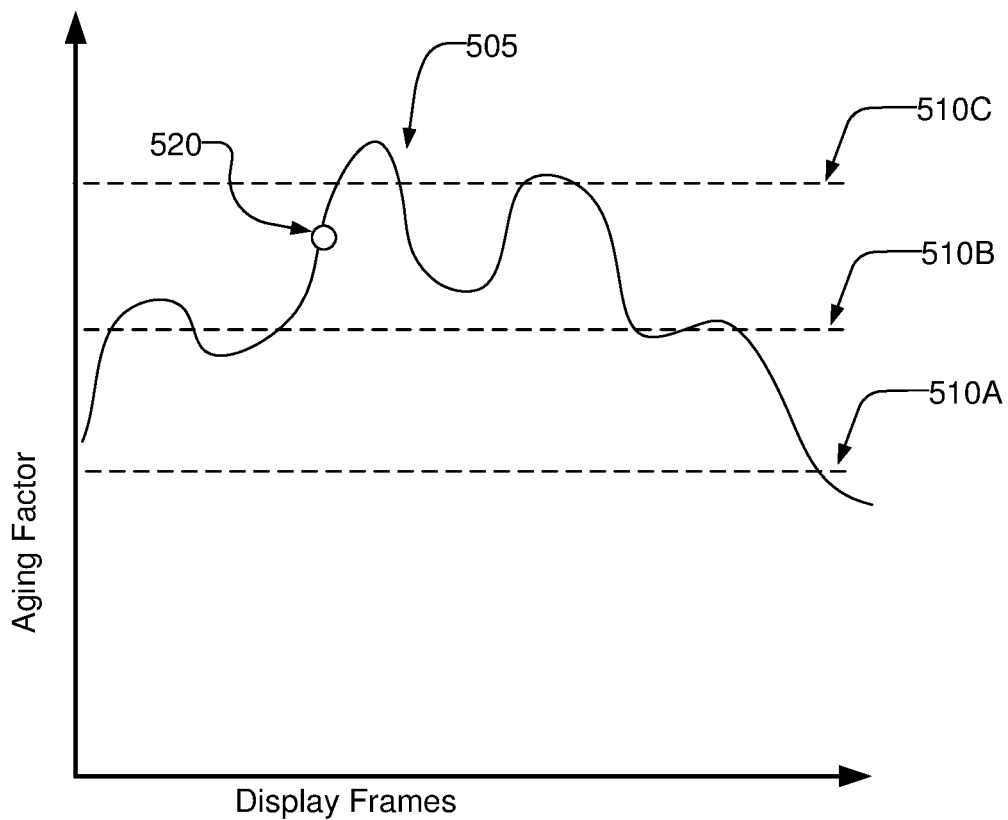
FIG. 5 is a conceptual diagram illustrating tracking of an aging factor for an electronic display over time, in accordance with an embodiment.

FIG. 5 is a conceptual diagram 500 illustrating one example method of determining the aging count increase value, in accordance with an embodiment. The diagram 500 includes a curve 505 illustrating the value of the aging factor for display frames while the electronic panel 115 displays example display data. The counter update module 420 compares the aging factor of a monitored frame to the thresholds 510A, 510B, and 510C to determine an interval containing the aging factor. For example, the aging factor at a particular time 520 corresponds to the interval between thresholds 510B and 510C. Accordingly, the counter update module 420 determines the count increase value from a function specific to the determined interval. The function may depend on the aging factor (as in Equations 2 or 3) or may be a predetermined value (as in Equation 1). In an embodiment where the counter increase value equals the aging factor, the aging counter at a particular time is equal to the integral under curve 505 between the initialization of the counter and the particular time.

Turning back to FIG. 4, the correction module 430 applies aging compensation to a subpixel in a subsequent frame according to the aging counter for the display portion containing the subpixel. To apply aging compensation, the correction module 430 modifies raw input display data for the subsequent frame according to a compensation value. The subsequent frame refers to a frame after the monitored display frames used to determine the aging counter. The correction module 430 may determine the compensation value for the subpixel based at least in part on the raw input display data for the subpixel. For example, the correction module 430 determines the compensation value as a digital level, driving voltage, or driving current to modify the raw input display data. The correction module 430 outputs modified display data for the subpixel determined by modifying the raw input display data according to the compensation value. For example, the correction module 430 modifies the digital level, driving voltage, or driving current of the raw input display data by combining (e.g., adding, subtracting, multiplying) the compensation value with the raw input display data.

The correction module 430 accesses the aging counter for a display portion from the calibration store 440 and determines a compensation value based on a mapping from the aging count value to the compensation value. In general, the mapping is an inverse of a decay function determined for the display portion. For example, the manufacturer of the electronic display 115 performs tests to determine the degradation of subpixels in response to the various aging factors. The manufacturer derives a relationship between an aging counter for a display portion and a drop in luminance from an initial value for the display portion. Accordingly, the mapping indicates an increase in digital level, display driving voltage, or display driving current to counter the drop in luminance expected at a particular aging count value. Since OLED subpixels that correspond to different colors exhibit different decay rates, the correction module 430 may apply different mappings from aging count to compensation value for display portions having different color subpixels. The correction module 430 may determine the compensation value from the aging count value using a lookup table included in the calibration store 440.

In some embodiments, the correction module 430 determines the compensation value based on the input display value in the input image data and the aging count value. As illustrated in FIG. 3A, the relationship between luminance and display data is non-linear, where a subpixel draws increasingly more current to incrementally increase luminance. Accordingly, the compensation value for a higher input display value is greater than the compensation value for a lower input display value. The correction module 430 may obtain the compensation value from a lookup table that is a function of both input display value and aging count value. There are a large number of combinations between input display value and aging count value, but the lookup table need not exhaustively list all the combinations. Instead, the lookup table may list representative compensation values over the range of aging count values, input display values, or both. For example, the correction module 430 determines the compensation value by interpolating between two or more representative compensation values from the lookup table.

In some embodiments, the correction module 430 determines compensation values at least in part to maintain consistent luminance values. As a result, the compensation value is a positive number that increases the digital level, driving current, and driving voltage to the subpixel. The correction module 430 may also determine compensation values at least in part to maintain color balance between two or more sets of subpixels corresponding to two or more color channels. For example, the correction module 430 uses first and second aging counters corresponding to the first and second sets of subpixels, respectively, each for different colors, to determine compensation values for either set of subpixels. To maintain color balance, the correction module 430 may determine a negative compensation value for the first set of subpixels and a positive compensation value for the second set of subpixels. In some embodiments, the correction module 430 maintains color balance by correcting the luminance of subpixels corresponding to each color, thereby restoring the initial balance of color.

The correction module 430 modifies the input display data for a subpixel according the compensation value. For example, the correction module 430 adds the compensation value to the input display data. In some embodiments, the correction module 430 determines the compensation value using a higher bit depth than the display data. For example, the correction module 430 determines the compensation value at the higher bit-depth (e.g., 10 bit), modifies the converted input display data according to the determined compensation value, and converts the modified display data to the bit depth of the electronic display 115 (e.g., 8 bit). This conversion beneficially improves the precision of the panel compensation aging correction.

Figure 6:
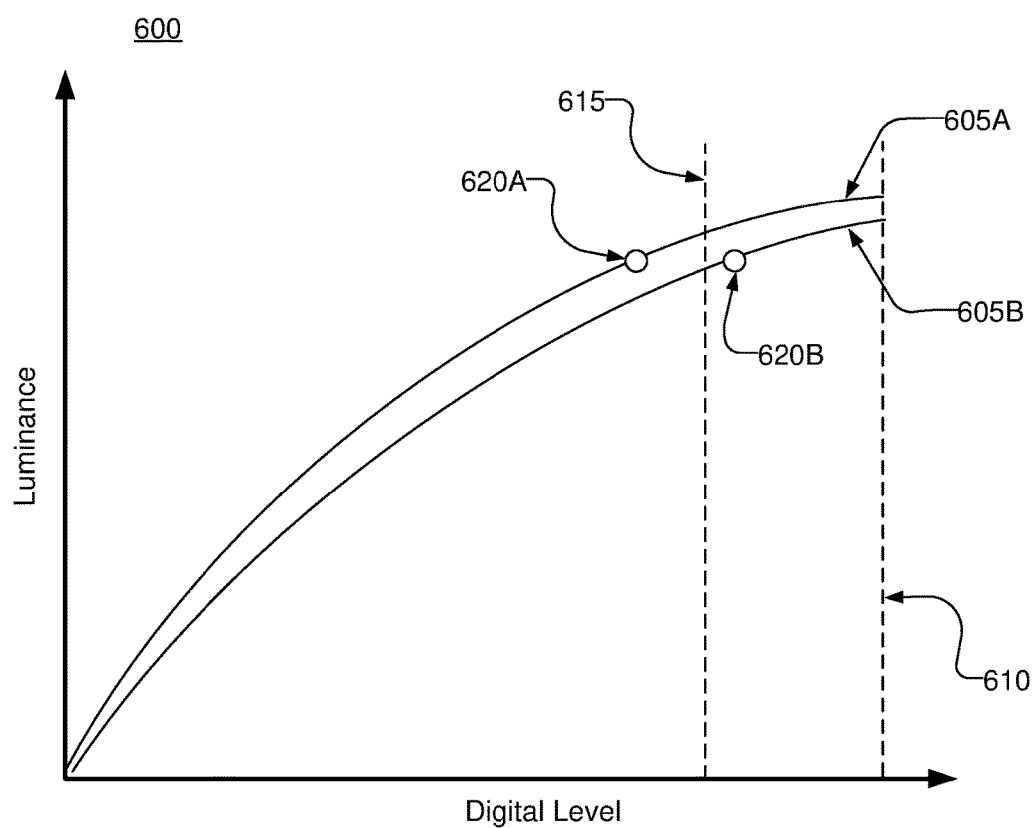
FIG. 6 is a conceptual diagram illustrating compensation for pixel aging through overdriving, in accordance with an embodiment.

The correction module 430 may output modified display data that overdrives the electronic display 115. FIG. 6 is a conceptual diagram 600 illustrating compensation for pixel aging through overdriving, in accordance with an embodiment. Curves 605A and 605B illustrate the relationship between digital level used to drive a subpixel and resulting luminance from the subpixel after initial usage and later usage, respectively. The electronic display 115 supports overdriving up to a panel threshold 610 in digital level. The VR console 110 sends input display data having a digital level less than an input threshold 615, which is less than the panel threshold 610. After the initial usage, the VR headset 105 receives display data 620A at a first digital level less than the input threshold. Since the electronic display 115 has experienced minimal decay, the subpixel emits light with a luminance near that expected for the first digital level.

After later usage, VR headset 105 again receives input display data at the first digital level. The correction module 430 modifies the input display data to compensate for panel aging and outputs modified display data 620B at a second digital level higher than the first digital level and higher than the input threshold. The subpixel emits light having substantially the same luminance as expected for the first digital level after initial usage. Overdriving the electronic display 115 thus compensates for the aging of the subpixel. By reserving an upper range in digital level for overdriving, the VR headset 105 may avoid apparent aging for an increased time, thereby extending the lifetime of the electronic panel 115.

Turning to FIG. 4, the calibration store 440 contains aging counters corresponding to the various display portions (e.g., individual pixels, pixel regions, individual subpixels, subpixels of a particular color in a pixel region). The calibration store 440 may further contain a lookup table that maps an aging count value, an input display value, or both to a compensation value. For example, the calibration store 440 includes a lookup table for each color of subpixel.

In some embodiments, the functions of the display calibration unit 130 are performed in whole or in part by the VR console 110. For example, the display calibration unit 130 accesses the lookup table mapping aging count values to compensation values from the VR console 110. As another example, the VR headset 105 sends aging count values to the VR console 110, which modifies display data according to the compensation values and sends the modified display data to the VR headset 105. As a third example, the VR engine 155 performs some or all of the functionality described with respect to the correction module 430.

Driving an Electronic Display According to Calibration Data

Figure 7:
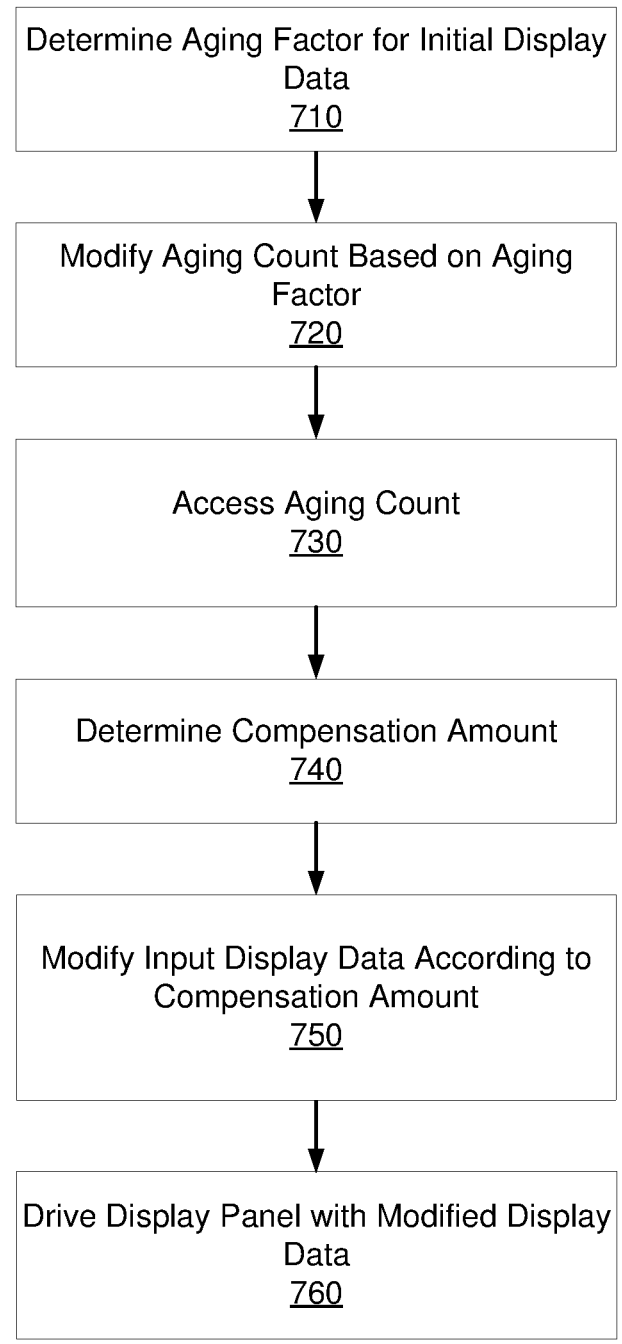
FIG. 7 is a flowchart of an example process for compensating for pixel aging, in accordance with an embodiment.

FIG. 7 is a flowchart of an example process for compensating for pixel aging, in accordance with an embodiment. In some embodiments, the method may include different and/or additional steps than those described in conjunction with FIG. 7. Additionally, in some embodiments, the method may perform the steps in different orders than the order described in conjunction with FIG. 7. Moreover, although described with respect to the VR headset 105, some or all of illustrated steps may be performed by the VR console 110.

The VR headset 105 determines 710 an aging factor based on initial display data for a display portion of the electronic display 115 during one or more monitored frames. For example, the VR headset 105 determines 710 the aging factor with the use tracking module 410. The aging factor is indicative of aging of pixels in the display portion of the electronic display 115 due to use corresponding to the initial display data. The VR headset 105 increases or otherwise modifies 720 an aging counter for the display portion based on the determined aging factor. For example, the counter update module 420 modifies 720 the aging counter. The VR headset 105 stores the aging count in a memory. For example, the memory may be a cache or flash memory containing the calibration store 440.

The VR headset 105 accesses 730 the aging count from memory (e.g., calibration store 440). The VR headset 105 determines 740 a compensation value for the display portion based on the aging counter for the display portion. The VR headset 105 modifies 750 input display data for the display portion during a subsequent frame according the determined compensation value. For example, the correction module 430 accesses 730 the aging count, determines 740 the compensation value, and modifies 750 the input display data. The VR headset 105 drives 760 the display portion of the electronic display 115 with the modified input display data during the subsequent frame. For example, the VR headset 105 modifies drive currents corresponding to the input display data (e.g., in a gamma correction look-up table) according to the correction values. In some embodiments, the VR headset 105 overdrives the electronic display 115 with a digital level above a maximum digital level of the input display data. In other words, the VR console 110 (or other source of input display data) reserves an upper portion of digital levels for the electronic display 115 to compensate for pixel aging.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display system comprising:
an electronic display;
a processor; and
a non-transitory computer readable storage medium having instructions encoded thereon that, when executed by the processor, cause the processor to:
identify a cumulative aging amount indicating an amount of aging of one or more pixels of a display portion of the electronic display;
generate an updated cumulative aging amount based upon the cumulative aging amount and one or more monitored inputs used to drive the one or more pixels of the display portion over one or more frames;
modify input display data for the display portion by a correction value to generate modified input display data for the display portion during a subsequent frame, wherein the correction value is based upon the updated cumulative aging amount and a value of the input display data for the display portion.

2. The display system of claim 1, wherein the instructions are further configured to cause the processor to drive the display portion using the modified input display data during the subsequent frame.

3. The display system of claim 1, wherein the one or more monitored inputs comprises an average digital level used the drive one or more pixels of the display portion during the one or more frames.

4. The display system of claim 1, wherein the one or more monitored inputs comprises an average driving voltage supplied to one or more pixels of the display portion during the one or more frames.

5. The display system of claim 1, wherein the one or more monitored inputs comprises an average duty cycle of one or more pixels during the one or more frames.

6. The display system of claim 1, wherein the one or more pixels correspond to one or more subpixels for a single color channel.

7. The display system of claim 1, wherein generating the updated cumulative aging amount comprises:
comparing a value of a first monitored input of the one or more monitored inputs to a plurality of thresholds defining a plurality of non-overlapping intervals over a range of the first monitored input;
determining that the value of the first monitored input is included in one of the intervals in response to the value of the first monitored input being greater than a lower threshold of said one of the intervals and less than an upper threshold of said one of the intervals;
in response to determining that the value of the first monitored input is included in said one of the intervals, determining a count increase value corresponding to the interval; and
increasing the cumulative aging amount by the count increase value to generate the updated cumulative aging amount.

8. The display system of claim 7, wherein updating the cumulative aging amount further comprises:
determining a difference between the value of the first monitored input and one of the lower threshold and the upper threshold of said one of the intervals; and
determining the count increase value based upon the determined difference.

9. The display system of claim 1, wherein the updated cumulative aging amount corresponds one or more subpixels for a first color channel, and wherein modifying the input display data for the display portion to generate the modified input display data comprises:
accessing a second cumulative aging amount for second subpixels corresponding to a second color channel;
accessing a third cumulative aging amount for third subpixels corresponding to a third color channel;
generating the modified input display data for the first subpixels based on the updated cumulative aging amount corresponding to the first color channel, the second cumulative aging amount, and the third cumulative aging amount in order to maintain color balance between the first, second, and third color channels.

10. The display system of claim 1, wherein modifying the input display data to generate the modified input display data during the subsequent frame comprises:
determining the modified input display data at a processing bit depth greater than a display bit depth used to drive the electronic display; and
converting the modified input display data to the displayed bit depth.

11. The display system of claim 1, wherein
wherein the electronic display is driven by display data with digital levels less than a panel threshold,
wherein the input display data has digital levels less than an input threshold that is less than the panel threshold, and
wherein modifying the input display data during the subsequent frame comprises increasing a digital level of the input display data such that the modified input display data includes a digital level greater than the input threshold and less than the panel threshold.

12. A method comprising:
identifying a cumulative aging amount indicating an amount of aging of one or more pixels of a display portion of an electronic display;
generate an updated cumulative aging amount based upon the cumulative aging amount and one or more monitored inputs used to drive the one or more pixels of the display portion over one or more frames;
modify input display data for the display portion by a correction value to generate modified input display data for the display portion during a subsequent frame, wherein the correction value is based upon the updated cumulative aging amount and a value of the input display data for the display portion.

13. The method of claim 12, wherein the one or more monitored inputs comprises at least one of: an average digital level used the drive one or more pixels of the display portion during the one or more frames, an average driving voltage supplied to one or more pixels of the display portion during the one or more frames, or an average duty cycle of one or more pixels during the one or more frames.

14. The method of claim 12, wherein the one or more pixels correspond to one or more subpixels for a single color channel.

15. The method of claim 12, wherein generating the updated cumulative aging amount comprises:
   comparing a value of a first monitored input of the one or more monitored inputs to a plurality of thresholds defining a plurality of non-overlapping intervals over a range of the first monitored input;
   determining that the value of the first monitored input is included in one of the intervals in response to the value of the first monitored input being greater than a lower threshold of said one of the intervals and less than an upper threshold of said one of the intervals;
   in response to determining that the value of the first monitored input is included in said one of the intervals, determining a count increase value corresponding to the interval; and
   increasing the cumulative aging amount by the count increase value to generate the updated cumulative aging amount.

16. The method of claim 12, wherein the updated cumulative aging amount corresponds one or more subpixels for a first color channel, and wherein modifying the input display data for the display portion to generate the modified input display data comprises:
   accessing a second cumulative aging amount for second subpixels corresponding to a second color channel;
   accessing a third cumulative aging amount for third subpixels corresponding to a third color channel;
   generating the modified input display data for the first subpixels based on the updated cumulative aging amount corresponding to the first color channel, the second cumulative aging amount, and the third cumulative aging amount in order to maintain color balance between the first, second, and third color channels.

17. The method of claim 12, wherein modifying the input display data to generate the modified input display data during the subsequent frame comprises:
   determining the modified input display data at a processing bit depth greater than a display bit depth used to drive the electronic display; and
   converting the modified input display data to the displayed bit depth.

18. The method of claim 12, wherein
   wherein the electronic display is driven by display data with digital levels less than a panel threshold,
   wherein the input display data has digital levels less than an input threshold that is less than the panel threshold, and
   wherein modifying the input display data during the subsequent frame comprises increasing a digital level of the input display data such that the modified input display data includes a digital level greater than the input threshold and less than the panel threshold.

* * * * *

UNITED STATES PATENT AND TRADEMARK OFFICE
CERTIFICATE OF CORRECTION

PATENT NO. : 10,018,838 B2
APPLICATION NO. : 15/692277
DATED : July 10, 2018
INVENTOR(S) : Richards et al.

Page 1 of 1

It is certified that error appears in the above-identified patent and that said Letters Patent is hereby corrected as shown below:

In the Claims

Column 13, Line 40, after "used" delete "the" and insert -- to --.

Column 14, Line 13, after "corresponds" insert -- to --.

Column 14, Line 36, after "claim 1," delete "wherein".

Column 14, Line 63, after "level used" delete "the" and insert -- to --.

Column 16, Line 17, after "claim 12," delete "wherein".

Signed and Sealed this
Eleventh Day of December, 2018

Andrei Iancu
*Director of the United States Patent and Trademark Office*